UNITED STATES PATENT OFFICE.

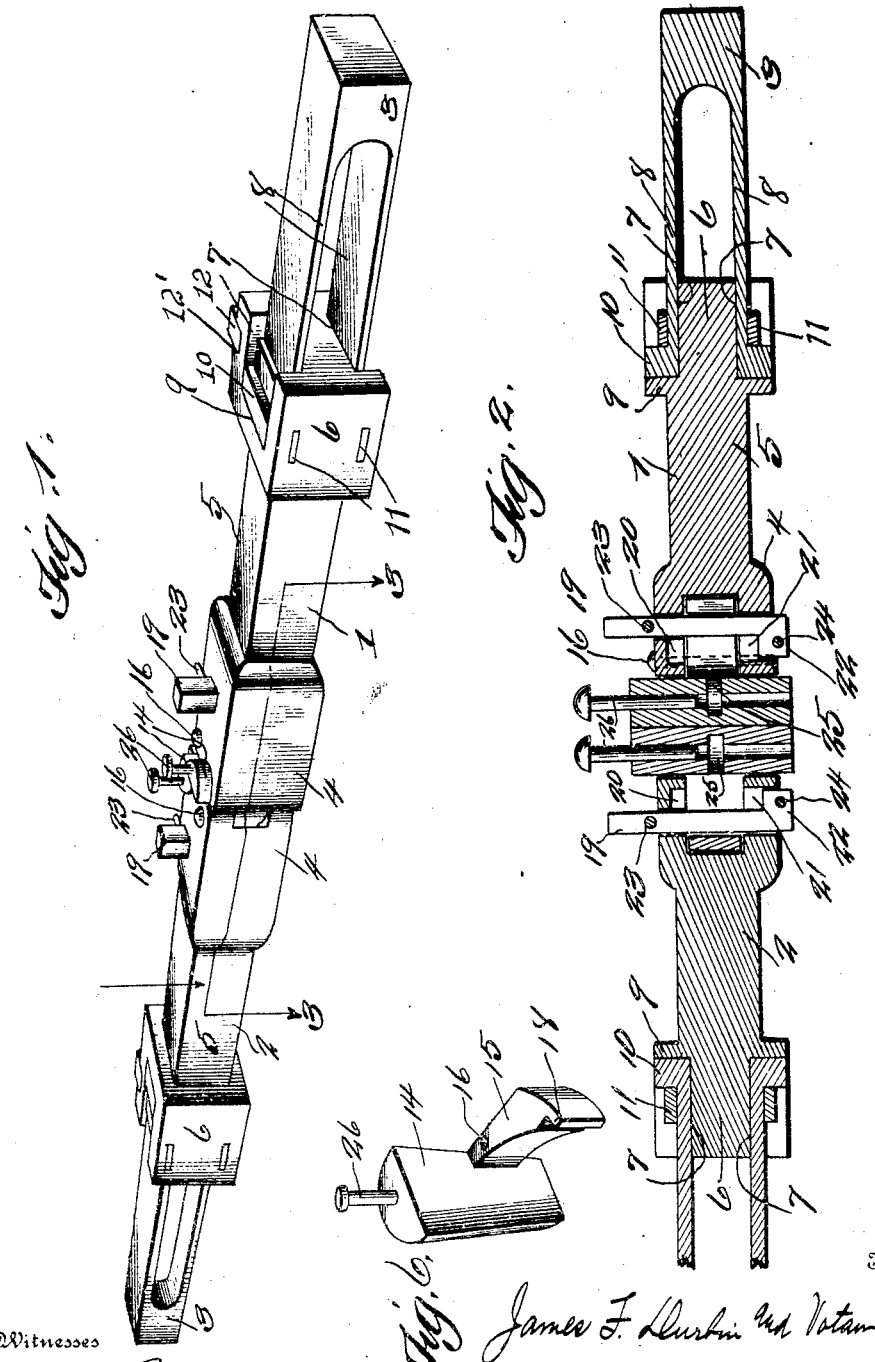

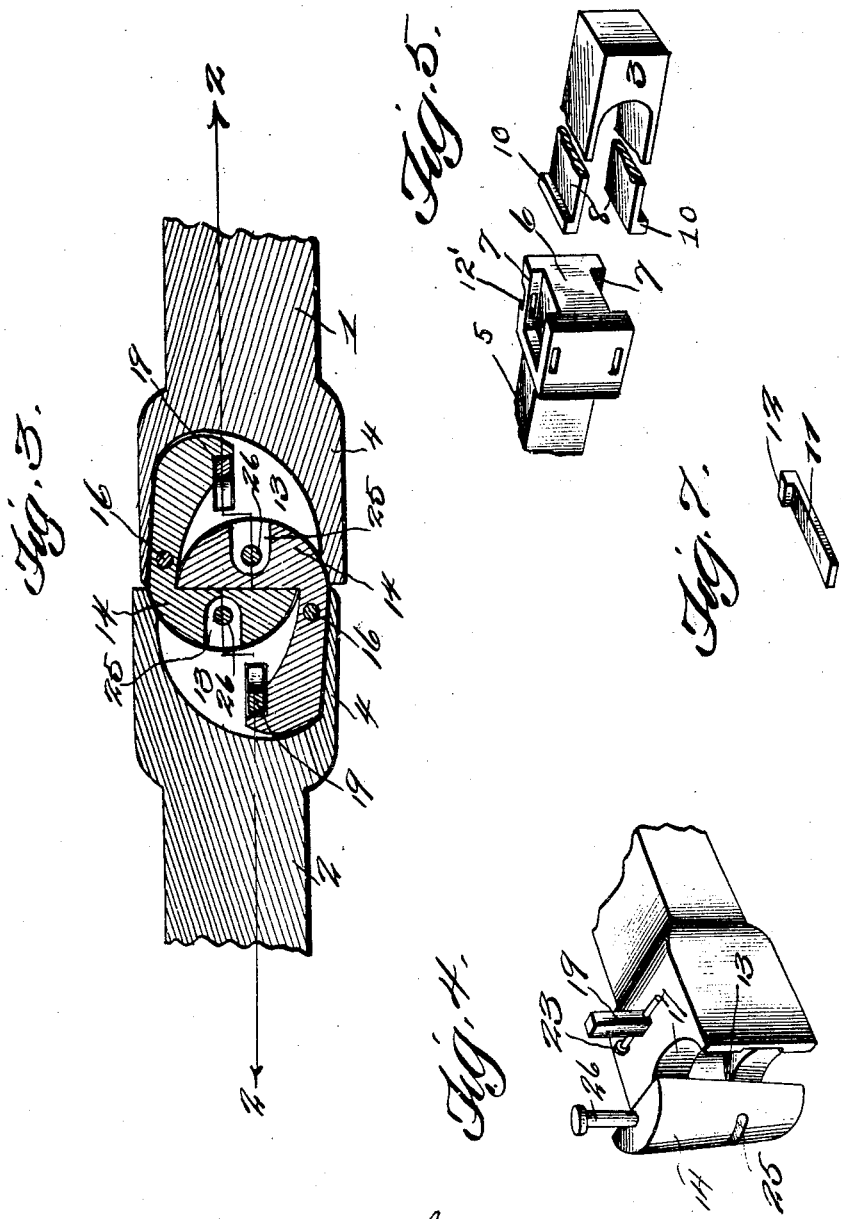

JAMES F. DURBIN AND VOTAW S. DURBIN, OF FORT SCOTT, KANSAS.

CAR-COUPLING.

No. 919,331.　　　Specification of Letters Patent.　　Patented April 27, 1909.

Original application filed June 25, 1908, Serial No. 440,247. Divided and this application filed December 8, 1908.
Serial No. 466,469.

*To all whom it may concern:*

Be it known that we, JAMES F. DURBIN and VOTAW S. DURBIN, citizens of the United States, residing at Fort Scott, in the county of Bourbon and State of Kansas, have invented certain new and useful Improvements in Car-Couplings, of which the following is a specification.

This invention relates to new and useful improvements in car coupling means and aims as a primary object to provide a car coupler in which novel means are provided for positively and securely connecting the coupling members with the ends of the draw bar for the purpose of removing or renewing parts or otherwise.

The present application is a division of an application filed by us June 25, 1908, Serial Number 440247.

The above and other objects will appear in the course of the following description in which reference is had to the accompanying drawings forming a part of this specification, like characters of reference designating similar parts throughout the several views, wherein:—

Figure 1, is a detailed perspective view of coöperating coupling parts constructed in accordance with the present invention. Fig. 2, is a longitudinal sectional view of such coupling parts on the line 2—2 of Fig. 3. Fig. 3, is a horizontal sectional view of said parts on the line 3—3 of Fig. 1. Fig. 4, is a detail perspective view showing the end construction of one of the coupling parts, the other part complementary thereto being a counterpart in construction. Fig. 5, is a detailed perspective view showing in detached relation the end formations of a coupling part and the draw bar member connected to said part. Fig. 6, is a detailed perspective view of a locking knuckle embodied as a component part of the invention. Fig. 7, is a detailed perspective view of one of the keys employed to join the coupling part and draw bar member.

The coupling parts are generally designated 1 and 2, and the draw bar members 3. The parts 1 and 2 are similarly constructed and complement one another in interfitting relation in which relation they are held locked by means to be hereafter described. Hence, it will be understood that a description of one coupling part is equally as applicable to both. Each coupling part comprises a head portion 4 and a shank portion 5, which latter has at its end an enlargement or head 6, formed with grooves 7 in two opposite faces. The grooves 7 serve as seats to receive and hold the ends of bifurcations 8 provided on each draw-bar member 3, the bifurcations 8 being snugly received in grooves 7, and bearing against shoulders 9 forming the end walls of the grooves 7. Said bifurcations are in turn formed at their ends with outwardly extending shoulders or projections 10 which are confined between the said shoulders 9 and transverse locking keys 11, removably inserted through openings in the side walls of the enlargement or head 6. One of the keys 11, is illustrated more particularly in Fig. 7. Said keys each have an enlarged stop head 12, the openings through which the keys are inserted being countersunk as at 12′ to receive the said stop head.

The head portions 4 are formed with recesses 13 opening through the ends thereof. The locking of the parts 1 and 2 is effected primarily by knuckles 14, having angularly extending shanks 15 which work and are confined in the recesses 13 by means of pivot pins 16, which pass through said shanks 15 at a point adjacent the junction thereof with the knuckles 14. The latter have flat contacting faces and curved faces and are of tapering form, so that their general shape may be described as that of a half segment of a conical frustum. The head portions 4 are formed in their end faces with curved recesses 17, which extend at a right angle to the recesses 13 and which are shaped conformably to, and serve as seats to receive, the knuckles 14, when the latter are engaged with one another as shown more particularly in Fig. 3. In such relation said knuckles, by virtue of their general hook shape engage rearwardly of one another, their flat faces contacting as above intimated. The shanks 15 are formed at their ends with extended shoulders 18, with which coöperate vertical locking pins 19 which are slidable through recesses 20 and 21 constructed as extensions of the recesses 13, the pins 19 being flat sided so as to be non-rotatable. The recesses 20 are countersunk to receive stop lugs 22 formed on the ends of the pins 19 to limit the upward movement of the latter, the downward movement of said pins being limited by cotter pins 23, which are engaged through the adjacent outer faces of the head portions 4. When the pins 19 have been moved downwardly and the knuckles 14 engaged in the manner above set forth, said pins bear against the shoulders 18 to prevent pivotal movement of the shanks and consequently to lock the knuckles in their engaged relation. The pins 19 are held against displacement from their active positions by removable pins 24, carried on the faces of the head portions 4 and which are engaged through the lugs 22 and which appear in section in Fig. 2.

The knuckles 14 are provided in their curved faces with recesses 25 to receive links (not shown) which may be used as coupling elements in emergency cases such as derailment, which links are held in said recesses by headed locking pins 26, movable axially of said knuckles.

In use, the pins 19 serve to effectually lock the knuckles 14 against axial displacement from their interlocked relation and lateral displacement is effectually prevented by the tapering contour of said knuckles which upon undue vertical play of the parts in either direction have a wedging action against the curved tapering faces of the recesses 17.

The manner of connecting the coupling parts to the draw bar members permits of the ready renewal and replacement of broken or worn parts and also of making other repairs which may be found necessary with but a slight expenditure of time and labor.

The manner of holding the pins 19 by the cotter pins 23 and the pins 24 assures of said pins 19 being held actively assembled under all conditions and consequently accidental disjointment of the coupled parts is impossible.

From the above it will be evident that a secure union exists between the coupling parts and the draw bars, and one wherein by mere removal of keys 11, immediate and instant separation between the parts may be had, for purposes of repair, renewal or otherwise. Furthermore, it is evident that the transverse keys 11, assume all of the pressure exerted by the draw bar 3, on the one hand, and the coupling member on the other hand which provides an efficient and capable connection.

Having fully described our invention, we claim:

1. In combination with a coupling part having a shank, a draw bar formed with a bifurcated end, said shank at one end being formed with a pair of grooves on opposite top and bottom faces, said grooves forming shoulders at their inner ends, said shank on its side faces above and below the walls formed by said groove being formed with transverse openings, said openings at one end thereof being countersunk, a shoulder on each bifurcation of said draw bar to abut corresponding shoulders of the shank, and a pair of independent transverse locking keys each having an enlarged head being passed through said transverse openings to have their enlarged heads engage in said countersunk ends of the transverse openings.

2. In combination with a coupling part having a shank, a draw bar formed with a bifurcated end, a shoulder on each bifurcation, said shank at one end being formed with a groove on its top face and a groove on its bottom face, said grooves forming a shoulder at their inner ends and being disposed between the side-faces of the shank so as to form side walls, said bifurcations engaging the top and bottom faces, the shoulders and the side walls formed by said grooves, the top and bottom portions of the side walls formed by said grooves being formed with a pair of registering apertures, and a transverse locking key passed through each pair of apertures to engage the shoulders on said bifurcations.

In testimony whereof we affix our signatures, in presence of two witnesses.

JAMES F. DURBIN.
VOTAW S. DURBIN.

Witnesses:
A. C. KARLESKINT,
C. A. BECK.